United States Patent Office 2,843,034
Patented July 15, 1958

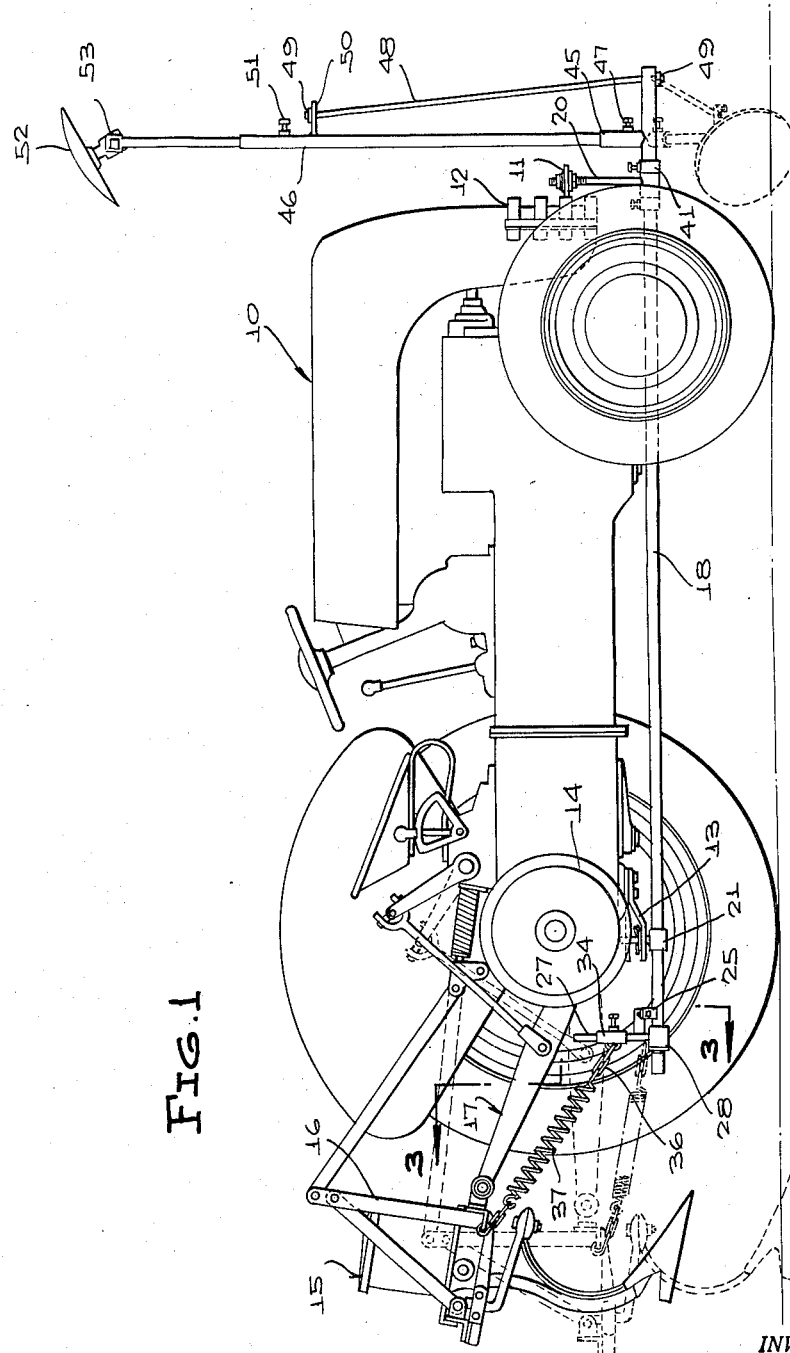

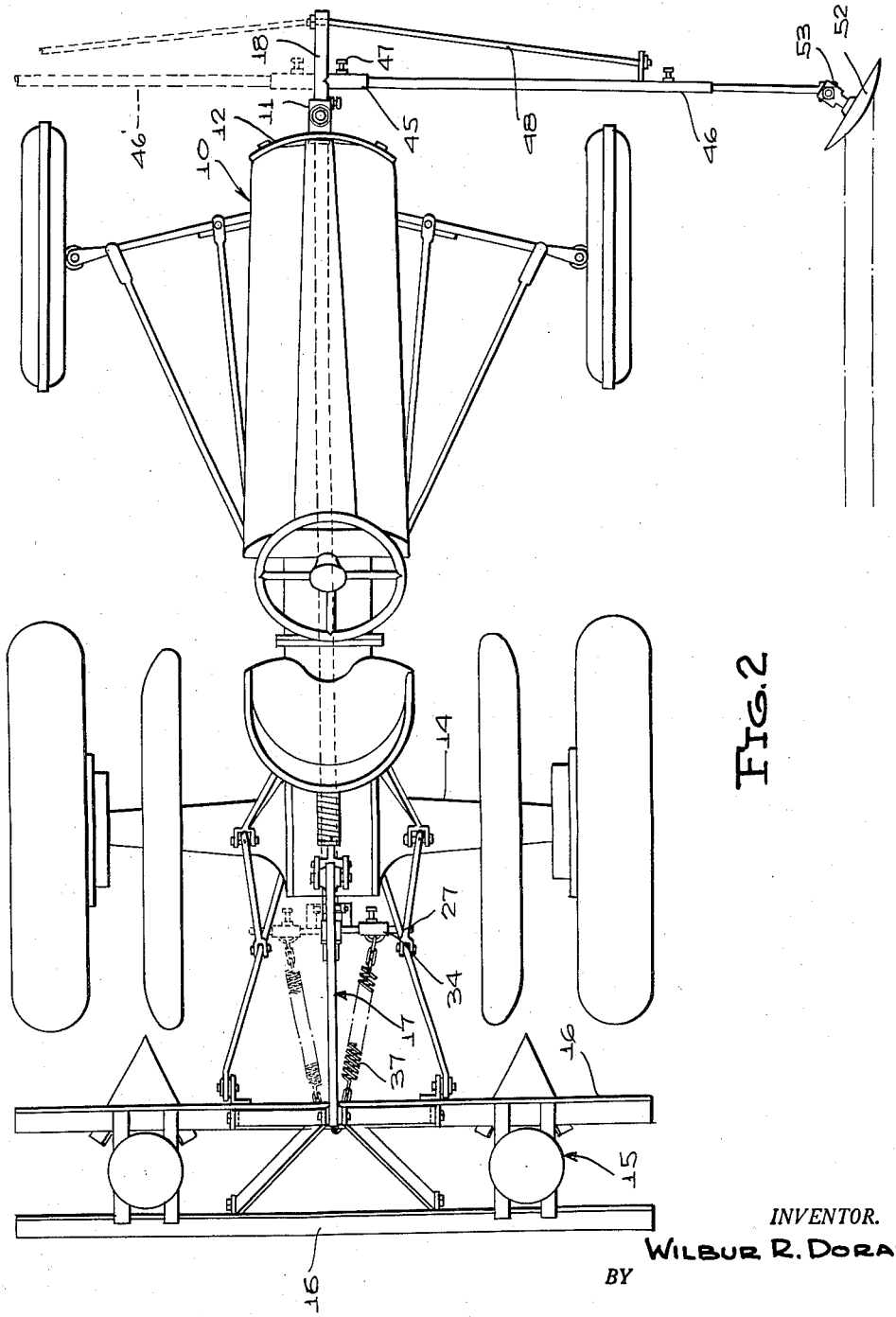

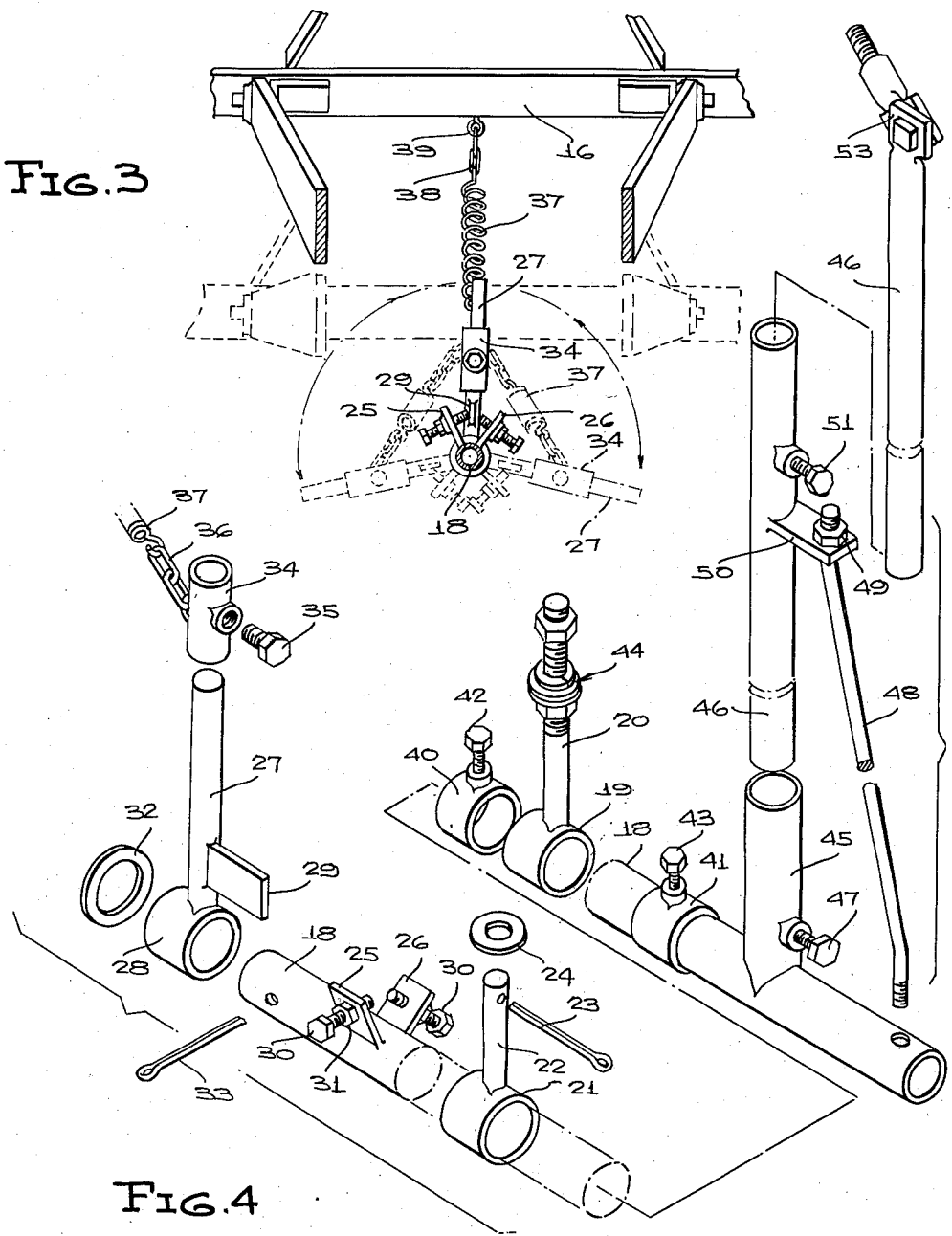

2,843,034
TRACTOR-MOUNTED ROW MARKER

Wilbur R. Doran, Kenton, Tenn.

Application April 8, 1955, Serial No. 500,105

3 Claims. (Cl. 97—230)

The present invention relates to a row marker for mounting on a tractor.

The primary object of the present invention is to provide a row marker for a tractor which automatically swings from one side of the tractor to the other when the implement attached to the tractor is raised and lowered.

Another object of the present invention is to provide a row marker for a tractor which may be retained on one side of the tractor while the implement attached to the tractor is raised and lowered by a simple control of the means for raising and lowering the implement.

A further object of the present invention is to provide a row marker for a tractor which is easily attached to a tractor and to the implement carried by the tractor, and one which is simple in construction, effective in action, sturdily constructed and able to stand hard usage.

These and other objects and advantages of the present invention will be fully apparent from the following description when taken in connection with the annexed drawings, in which:

Figure 1 is a side view of the tractor with one wheel removed to show the attachment of the present device to the tractor and to a seed planter carried by the tractor, Figure 2 is a top plan view of the assembly shown in Figure 1, Figure 3 is a detailed view greatly enlarged taken on line 3—3 of Figure 1, and Figure 4 is an exploded view of the components of the present invention.

Referring in greater detail to the drawings in which like numerals indicate like parts throughout the several views, the present invention consists in a row marker for mounting on a tractor such as is shown in Figures 1 and 2 as indicated generally by the reference numeral 10 and one having a bumper hitch 11 attached to the bumper 12 and a hitch 13 attached to the rear axle housing 14, underneath the latter.

A seed planter as indicated generally by the reference numeral 15 in Figures 1 and 2, and has a frame 16 supported on the hydraulic lift of the tractor, the lift being indicated generally by the reference numeral 17 and operatively connected to the planter so as to raise and lower it in upward and downward movements.

The present invention comprises a shaft 18 extending longitudinally of the tractor 10 beneath the same and connected adjacent the forward end to the front bumper hitch 11 by means of a sleeve 19 having a vertically extending threaded stud 20 welded or otherwise secured to one side, the stud being received in a hole in the hitch 11 and dependingly supported therefrom. A similar sleeve 21 has a vertical pin 22 fixedly secured to it, the upper end of the pin having a hole therethrough receiving a cotter pin 23, there being provided a washer 24 to keep the pin 22 suspended from the rear axle hitch 13 as seen in Figure 1.

The rear end of the shaft 18 extends to a point adjacent the implement frame 16 and rearwardly of the rear axle 14 and carries on its rear end portion a pair of upright lugs 25 and 26 arranged at an angle to each other. An operating arm 27 is secured by its one end to a sleeve 28 which slips over the shaft 18. The operating arm 27 carries an abutment plate 29 which is positioned between the lugs 25 and 26, the latter both having adjusting bolts 30 and locking nuts 31 for adjusting the swinging movement of the operating arm 27 relative to the shaft 18. The washer 32 and cotter pin 33 secure the operating arm in position upon the shaft 18.

The operating arm 27 has a sleeve 34 slidably and adjustably positioned, with a bolt 35 for fixing it in any adjusted position on the arm 27. A length of chain 36 connects the sleeve 34 to one end of a spring 37, the other end of the spring being connected by a length of chain 38 to an eye-formation 39 fixed to the implement frame 16.

A pair of collars 40 and 41 having locking bolts 42 and 43, respectively, secure the sleeve 19 in its position relative to the shaft 18 to present longitudinal movement of the shaft 18 relative to the tractor.

Locking nuts and washers indicated generally by the reference numeral 44 in Figure 4 permit the adjustment of the shaft 18 upwardly and downwardly relative to the tractor to maintain it in a generally horizontal position. A tubular socket 45 projects perpendicularly from the portion of the shaft 18 forwardly of the hitch 11 and receives one end of a marker arm 46, there being provided a stud bolt 47 for securing the marker arm within the socket 45. A brace 48 has one end threaded and secured by a nut (not shown) adjacent the forward end of the shaft 18 and has its other end threaded also and secured by another nut 49 to a plate 50 projecting from one side of the marker arm 46.

The marker arm 46 is formed in two sections with the outer section telescoping within the inner section and locked in any adjusted position by a bolt 51 so that the width of the rows being marked may be made adjustable.

A rotary disk 52 is carried on the free end of the marker arm 46, the disk being shown in Figures 1 and 2 and omitted from Figure 4 as being conventional and not a part of the invention. A knuckle joint 53 permits the adjustment of the angle of the disk 52 in order that the depth of the row mark made in the ground may be varied to suit conditions of the soil.

The marker arm 46 is shown in a vertical position in Figure 1 and shown in a horizontal position on one side of the tractor in Figure 2, it being indicated by dotted lines in the latter figure that the marker arm may be shifted to a position on the other side of the tractor, the dotted lines being indicated by the reference numeral 46'.

Referring to Figure 3, it will be seen that the lugs 25 and 26 with the interposed abutment plate 29 form a loose connection or lost-motion connection between the operating arm 27 and the shaft 18. In use, the sleeve 34 is adjusted upon the operating arm 27 and the strength of the spring 37 is adjusted by adding links to the chains 36 or 38 so that when the implement frame 16 is raised by the hydraulic system of the tractor, the operating arm 27 will rotate the shaft 18 in either a clockwise or counterclockwise direction from the horizontal position on either side of the tractor to an upright position at a small angle to the vertical.

By manipulating the controls of the hydraulic system, the operator of the tractor can raise the vehicle frame 16 rapidly to the limit of its upward movement which will cause the spring 37 to stretch initially and then to compress, pulling the marker arm 46 to the position at an angle to the vertical, the momentum of the moving marker arm 46 carrying it past the vertical position and to a similar position on the other side of the tractor. Lowering the vehicle frame 16 will then permit the marker arm 46 to descend to its horizontal position on the opposite side from where it was. When it is desired to keep the marker arm on one side of the tractor, manipulating the hydraulic system controls so that the vehicle frame 16 rises slowly or not to the limit of its upward movement, will permit the marker arm 46 to rise to an upright position without crossing over top dead center. Lowering of the vehicle frame 16 will then permit the marker arm to descend upon the same side of the tractor.

It will be seen, therefore, that the tractor with its attached implement and the row marker assembly of the present invention will permit the seeding or other working of the ground where the next row being marked as the tractor proceeds across the ground, turning at the end of the row and coming back upon the row mark while marking the next row successively across the field.

What is claimed is:

1. The combination with a tractor having a front bumper hitch, a hitch on the underside of the rear axle, and an implement frame mounted on the tractor for cyclic upward and downward movements relative thereto, of a row marker assembly comprising a horizontal shaft extending longitudinally of said tractor and dependingly connected to the front bumper hitch and the rear axle hitch for limited rotary movement in clockwise and counterclockwise directions, said shaft having a portion adjacent one end forwardly of said front hitch and having a portion adjacent the other end rearwardly of said rear axle hitch, a tubular socket projecting perpendicularly from said one end shaft portion, a marker arm carried by said socket and extending to one side of said tractor and movable vertically from one side of the tractor to the other responsive to rotary movement in clockwise and counterclockwise directions of said shaft, a row marker secured on the free end of said marker arm engageable with the ground when said marker is in either of its horizontal positions, and means connecting said marker arm to said implement frame so that upon execution of rapid movement of said implement frame upwardly said marker arm is moved to a position at an angle to the vertical on one side of the tractor and moves by its momentum to a position at an angle to the vertical on the other side of the tractor, said means comprising a sleeve circumposed about said shaft other end portion, one operating arm carried by said sleeve, a lost-motion connection between said operating arm and said shaft other end portion, and means connecting the free end of said operating arm to said implement frame.

2. The combination with a tractor having a front bumper hitch, a hitch on the underside of the rear axle, and an implement frame on the rear end of the tractor for cyclic upward and downward movements relative thereto, of a row marker assembly comprising a first support member dependingly secured to said front bumper hitch, a second support member dependingly secured to said rear axle hitch, a horizontal shaft carried by said support members for limited rotary movement in clockwise and counterclockwise direction, a tubular socket projecting perpendicularly from said one end shaft portion, a marker arm carried by said socket and extending to one side of said tractor and movable vertically from one side of the tractor to the other responsive to rotary movement in clockwise and counterclockwise directions of said shaft, a row marker secured on the free end of said marker arm engageable with the ground when said shaft is swung to the limit of its movement in either the clockwise or counterclockwise direction, and means connecting the other end of said shaft to said implement frame so that upon execution of rapid movement of said implement frame upwardly said marker arm is moved to a position at an angle to the vertical on one side of the tractor and moves by its momentum to a position at an angle to the vertical on the other side of the tractor, said means comprising a sleeve circumposed about said shaft, one operating arm carried by said sleeve, a lost-motion connection between said operating arm and said shaft, and means connecting the free end of said operating arm to said implement frame.

3. The combination with a tractor having a front bumper hitch, a hitch on the underside of the rear axle, and an implement frame mounted on the rear end of the tractor for upward movement relative thereto, of a row marker assembly comprising a first support member dependingly secured to said front bumper hitch, a second support member dependingly secured to said rear axle hitch, a horizontal shaft carried by said support members for limited rotary movement in clockwise and counterclockwise directions, a marker arm carried on one end of said shaft forwardly of said first bumper hitch and extending to one side of said tractor for swinging movement vertically from the one side of the tractor to the other, a row marker carried on the free end of said marker arm engageable with the ground when said shaft is swung to the limit of its movement in either the clockwise or the counterclockwise direction, and means connecting the other end of said shaft to said implement frame so that upon execution of rapid movement of said implement frame upwardly said marker arm is moved to a position at an angle to the vertical on one side of the tractor and moves by its momentum to a position at an angle to the vertical on the other side of the tractor, said means comprising a sleeve circumposed about said shaft, one operating arm carried by said sleeve, a lost-motion connection embodying a pair of upright lugs arranged at an angle to each other exteriorly of and carried by said shaft and an abutment plate carried by said operating arm interposed between and engaged by said lugs between said operating arm and said shaft, and means connecting the free end of said operating arm to said implement frame.

References Cited in the file of this patent

UNITED STATES PATENTS

| | | |
|---|---|---|
| 1,080,425 | Davis | Dec. 2, 1913 |
| 1,147,480 | Burke | July 20, 1915 |
| 1,211,365 | Englund | Jan. 2, 1917 |
| 1,544,094 | Krebs | June 30, 1925 |
| 2,465,660 | Phillips | Mar. 29, 1949 |
| 2,608,147 | Ezzell | Aug. 26, 1952 |